UNITED STATES PATENT OFFICE.

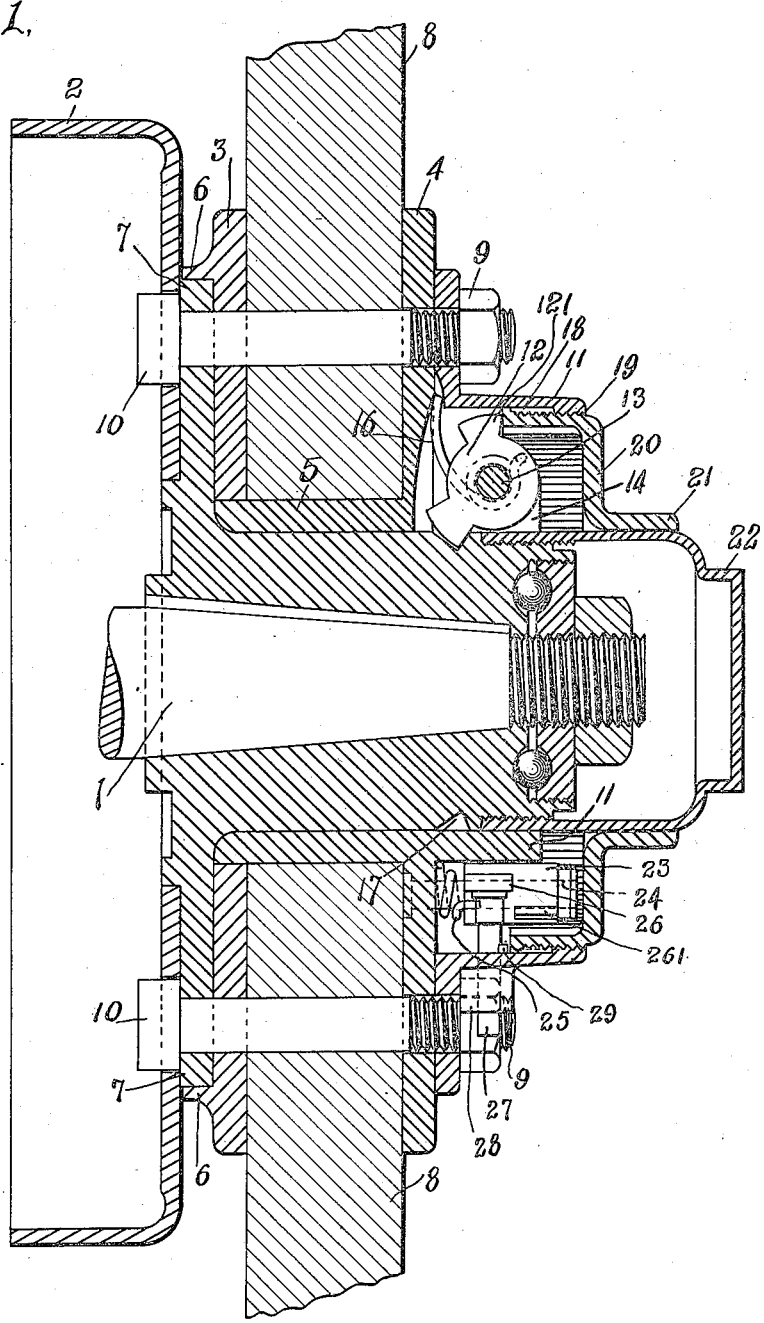

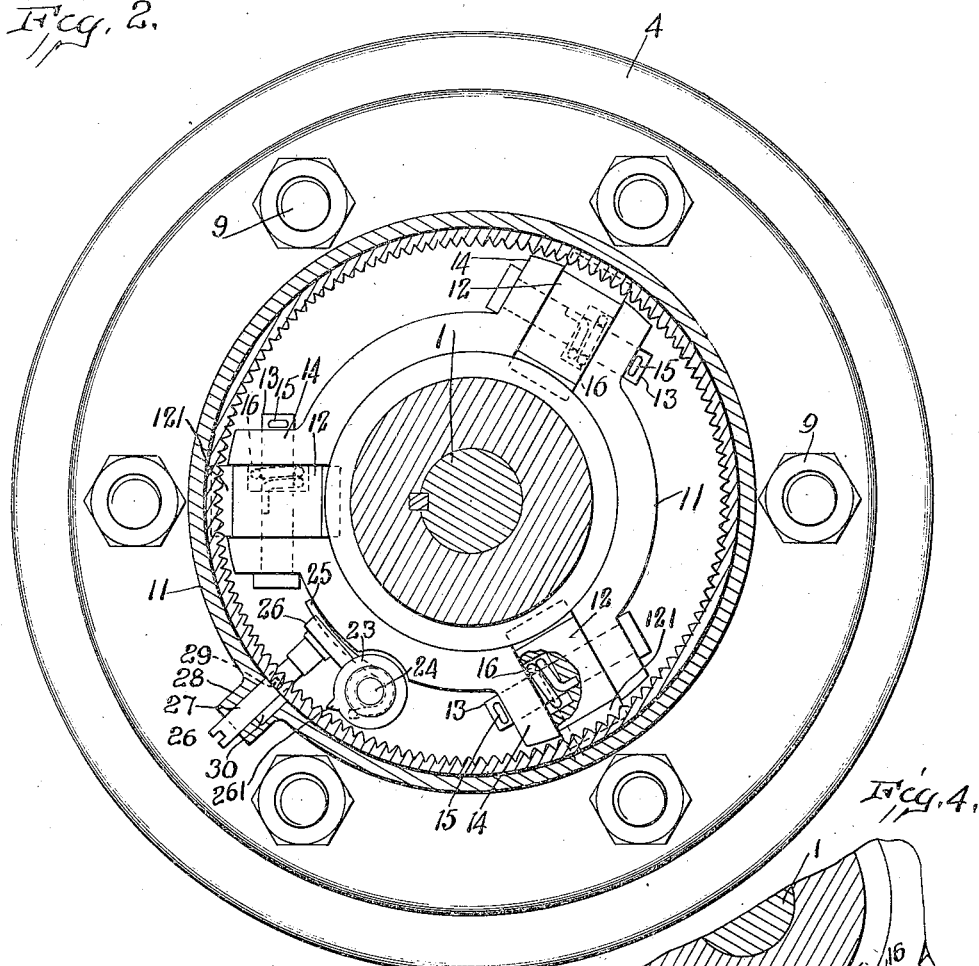
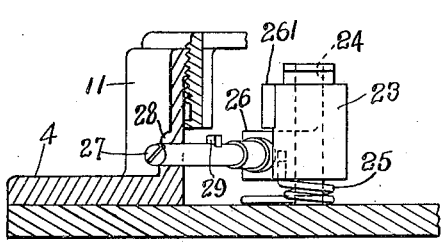

CHARLES T. RIDGELY, OF SPRINGFIELD, OHIO.

DEMOUNTABLE WHEEL.

1,298,792. Specification of Letters Patent. Patented Apr. 1, 1919.

Application filed June 18, 1917. Serial No. 175,251.

*To all whom it may concern:*

Be it known that I, CHARLES T. RIDGELY, a citizen of the United States, residing at Springfield, in the county of Clark and State of Ohio, have invented certain new and useful Improvements in Demountable Wheels, of which the following is a specification, reference being had therein to the accompanying drawing.

The object of this invention is to provide an improved detachable or demountable wheel adapted primarily for vehicles, such as automobiles. Among the particular objects of the invention are to improve the applicant's prior Patents Nos. 1,173,216 and 1,173,217, of Feb. 29th, 1916, and No. 1,186,833, of June 13th, 1916, but the improvement of these patents is not so much in the specific construction as in providing an improved form of wheel.

Additional objects are to provide a cheaper construction of wheel which is adapted to be used with wheels already in use and to be adjustable for wear and for different wheels. The improved wheel is quicker and easier to detach from the vehicle and the parts are interchangeable.

In the accompanying drawings, Figure 1 is a vertical section through the demountable wheel, the rim and part of the spokes of the wheel being broken away; Fig. 2 is a section on the line 2—2 of Fig. 1, looking in the direction of the arrow; Fig. 3 is a detail view of a locking device shown in Fig. 2; Fig. 4 is a view similar to Fig. 2, but having parts broken away and showing a modified form of locking device; and Fig. 5 is a detail view of the modified form of locking device of Fig. 4.

The construction provides a wheel detachable from a vehicle and provided with a supplementary hub adapted to be rigidly fastened to the main hub of the vehicle. The construction is such that the two parts of the hub are rigidly fastened together by certain locking dogs which force the supplemental hub to position, locking it with the main hub.

Referring to the drawings, Fig. 1 shows the main hub of the vehicle which is adapted to be rigidly connected to the axle 1 of the vehicle. Surrounding this main hub the supplemental hub is shown as connected with the usual brake band 2 of an automobile. The supplemental hub comprises flanges 3 and 4 connected by an annular or cylindrical part 5. While these three parts just mentioned may be cast integral, as shown the flange 3 is separate from the other parts, but the flange 4 and part 5 are cast integral. The flange 3 closely surrounds the part 5 and is slidable on it. The flange 3 is provided with an annular extension 6 which surrounds a smaller annular portion 7 of the brake band, thus preventing relative movement between the two parts. The wheel spokes 8 are carried between the flanges 3 and 4 of the supplementary hub and bolts 9 pass through these spokes and through the flanges 3 and 4 of the supplementary hub, passing also through holes in the brake band 2. As shown, the bolts have heads 10 which are slightly smaller than the holes in the brake bands 2. Thus these holes do not offer any obstruction to the passing of the bolt heads 10, though the holes do compel the brake band and the supplementary hub to rotate substantially together. In the mounting of the wheel the bolts 9 are loosened so that the flange 4 and part 5 may be withdrawn from the flange 3. The flange 3 is then placed on one side of the spokes and the flange 4 on the other side, whereupon the bolts 9 may be inserted through the spokes and tightened.

The flange 4 of the supplementary hub is provided with an annular extension 11, this being possibly best shown in Fig. 2. This extension 11 is cut away in several places to permit carriage by it of locking dogs 12, of which three are shown. It will be understood that a greater or less number may be used. The dogs 12 are carried on headed pins 13 passed through brackets 14 formed on the extension 11 of the flange 4 and these headed pins may be prevented from detachment by cotter pins 15, or in any other desired way. As shown in Fig. 1, springs 16 are provided for each of the locking dogs 12 serving to move them in clockwise direction in this figure.

The main hub 1 is provided with an annular groove 17 in which the locking dogs 12 are adapted to move. The position of Fig. 1 shows the locking dogs in their locking position and it will be readily seen that they prevent the movement of the supplementary hub relative to the main hub.

An annular cap, 18 is provided on the flange 4 of the supplemental hub, and, as shown, it is held to this flange by the bolts 9. The cap 18 is provided with internal thread 19 which meshes with a similar thread on an operating cap 20 having an extension 21 which may be octagonal or of any other desired shape so as to permit the cap 20 to be operated by a spanner wrench or the like. The inner end of the cap 20, as shown, engages a projection 121 on the locking dogs and it will be evident that rotating the cap 20 by the wrench will serve to rotate the dogs 12 around their carrying pins 13. In the position of Fig. 1 the cap 20 is at its inmost position and clearly prevents movement of the locking dogs out of the annular groove 17 in the main hub. Thus, the supplementary hub and the main hub are positively locked together. Rotation of the cap 20 in the opposite direction will cause its movement to the right in Fig. 1, thus withdrawing its inner end from the projections 121 of the dogs 12, whereupon their springs 16 will rotate them in a clockwise direction, thus withdrawing them from the groove 17 in the main hub. It will be evident that all of the locking dogs 12 are operated simultaneously by movement of this cap 20.

The main hub may be provided with a dust or grease cap 22, as is customary in automobile construction, and no particular number of bolts 9 is essential. As shown, there are six of them provided but more or less of these may be used.

In order to lock the operating cap 20 against movement and thus prevent accidental withdrawal of the dogs 12 from the groove 17 there is provided a locking device, shown in Fig. 3 and also seen in Fig. 2. This locking device comprises a cylinder 23 mounted on a pin 24 carried by the flange 4 of the supplementary hub. A spring 25 surrounds this cylinder and normally tends to rotate it counter-clockwise in Fig. 2. A pin 26 projects from this eccentric cylinder and rotates with it. Mounted in the cap 18 is a locking plunger 27 which may project through a boss 28 on said cap 18. This plunger 27 is positioned to engage the projecting arm 26 and is provided with a lug 29 adapted to pass through a notch 30 in the cap 18. Also the pin 27 may be rotated in the boss 28 as, for example, by a screw-cut in which a screw-driver or other tool may be applied.

The cylinder 23 is provided with a projecting fin 261, extending through about half the length of the cylinder and the cap 20 is knurled on the inside as shown. The fin 261 is adapted to engage the nurling of the cap 20 and thus lock the cap against rotation.

In Fig. 2 the parts just described are shown in their releasing position, that is, in the position in which the adjusting cap may be rotated. When the cap 20 has been turned and the locking dogs 12 consequently moved into the groove 17 whereby the wheel is locked on the main hub, a tool is then inserted into the pin 27 and this pin rotated until its lug 29 is in line with the motch 30. The spring 25 of the cylinder 23 then rotates the cylinder and the projection 26 as far as permitted by the withdrawal of the plunger 27. This brings the fin 261 of cylinder 23 against the nurling on the inside of the cap 20 and prevents movement of this cap in a counter-clockwise direction, which is the direction of movement in Fig. 2 which releases the locking dogs 12. It will be seen that the position of the plunger 27 in Fig. 2 is not its normal position but is the position in which the cap 20 may be rotated. Normally the plunger 27 will be in a position such that the lug 29 is outside of the notch 30 and the cylinder 23 and its projecting arm 26 and fin 261 are rotated in a counter-clockwise direction from the position of Fig. 2.

In the modified form of Figs. 4 and 5 the cap 20 may be knurled if desired, and the cylinder 23ª is mounted eccentrically on a pin 24ª and has a knurled outer surface. Fig. 4 shows the parts in their releasing position, and when plunger 27ª (which is precisely like plunger 27) is rotated to permit its lug 29ª to pass through the notch 30ª in cap 18ª, the cylinder is rotated in a counter-clockwise direction and thus brings its knurled surface against the inner side of cap 20 because of the increasingly greater distance which the surface of cylinder 23ª has from its pin 24ª.

The operation of the device will, it is thought, be clear from the foregoing description and it will be seen that the rotation of the cap 20 in a direction to force the locking devices 12 into the groove 17 of the main hub serves to give the supplementary hub as a whole an axial movement relative to the main hub and also to prevent such relative axial movement when the locking devices are in their locking position. Also the movement of the supplementary hub as a whole through the contact of the locking dogs 12 with the groove 17 serves to force the supplementary hub into strong frictional contact with the brake band 2 which is fast on the main hub 1.

It will be seen that the construction provides readily for taking up any wear on the parts due to the fact that the locking dogs may be moved more or less by the cap 20 until the supplementary hub and the brake band are forced tightly together. This also readily provides for slight inaccuracies of manufacture or for slightly different sizes of the spokes 8 of the wheels.

The parts of the device are easily made and readily put together and are well adapted for use with wheels already in use inasmuch as no accurate thickness of the spokes of the wheel is required. Any differences of sizes of spokes in the different wheels may be compensated for by tightening the bolts 9 to different extents as the flange 3 of the supplementary hub readily slides over the annular part 5 thereof.

While I have shown and described one embodiment of the invention it will be understood that the same has been chosen for purposes of illustration only and that I do not desire to be limited to the details of construction shown and described, for obvious modifications will occur to a person skilled in the art.

Having thus fully described my invention, what I claim as new and desire to secure by Letters Patent, is:—

1. In a wheel, a main hub, a supplemental hub, one of said hubs having an annular shoulder, dogs carried by the other of said hubs and constructed to engage said shoulder whereby to cause relative axial movement of said two hubs, and means for positively moving said dogs into engagement with said shoulder and spring actuated means for moving the dogs out of engagement with said shoulder.

2. In a wheel, a main hub, a supplemental hub surrounding said main hub, one of said hubs having an annular shoulder, rotatable dogs carried by the other of said hubs and constructed to engage said shoulder, means for rotating said dogs whereby to cause relative axial movement of said hubs when said dogs engage said shoulder, and devices fast to the shouldered hub, and against which the other of said hubs is moved by rotation of said dogs, and spring-actuated means for releasing said dogs.

3. In a wheel, a main hub, an annular shoulder, a supplemental hub surrounding said main hub, rotatable dogs carried by said supplemental hub and constructed to engage said shoulder, a holding device fast to said main hub against which said supplemental hub may contact, and a threaded cap for said supplemental hub, constructed to rotate said dogs into engagement with said annular shoulder, whereby to force said supplemental hub into contact with said holding device, and spring-actuated means to release said dogs.

4. In a wheel, a main hub, a supplemental hub surrounding and having axial movement on said main hub, a holding device fast to said main hub, and against which said supplemental hub may contact, rotatable dogs carried by one of said hubs and constructed to engage the other hub, thus causing relative axial movement of said hubs to force said supplemental hub against said holding device, and means for positively rotating said dogs, and spring-actuated means for releasing said dogs.

5. In a wheel, a main hub, a supplemental hub surrounding and having axial movement on said main hub, a holding device fast to said main hub, and against which said supplemental hub may contact, rotatable dogs mounted on said supplemental hub and constructed to engage a portion of said main hub, and a cap rotatable on said supplemental hub and constructed to engage and rotate said dogs and thereby force said supplemental hub into contact with said holding device.

6. In a wheel, a main hub, a supplemental hub, a shoulder on one of said hubs, dogs mounted on the other of said hubs, and constructed to engage said shoulder, springs moving said dogs away from position engaging said shoulder, a cap for moving said dogs into such engaging position, and means comprising a cylinder having a fin for locking said cap against movement in one direction.

7. In a wheel, a main hub, a supplemental hub, means for preventing relative axial movement of said hubs, devices comprising a cylinder having a fin for locking said preventing means against movement, and a pin for holding said cylinder in one position.

8. In a wheel, a main hub, a supplemental hub surrounding and having axial movement on said main hub, means for holding said hub against such axial movement, a cap on one of said hubs constructed to control said holding means, and means, comprising a cylinder having a fin, for locking said cap against movement.

9. In a wheel, a main hub, a supplemental hub surrounding and having axial movement on said main hub, a cap on one of said hubs having connections to control such axial movement, and means, comprising a cylinder having a fin, constructed to prevent movement of said cap.

10. In a wheel, a main hub, a supplemental hub surrounding and having axial movement on said main hub, devices carried by said supplemental hub for causing such axial movement, an element for preventing movement of said devices, a spring for moving said element in one direction, and a hand operated device for moving said element in the other direction.

In testimony whereof, I affix my signature.

CHARLES T. RIDGELY.